UNITED STATES PATENT OFFICE.

GEORGE H. REED, OF BOSTON, MASSACHUSETTS.

IMPROVED PREPARATION AND MANUFACTURE OF DYES AND COLORS.

Specification forming part of Letters Patent No. 50,495, dated October 17, 1865.

*To all whom it may concern:*

Be it known that I, GEORGE H. REED, of Boston, in the county of Suffolk and State of Massachusetts, have invented certain new and useful Improvements in the Preparation and Manufacture of Dyes and Colors; and I do hereby declare that the following is a full, clear, and exact description of the process of making and using the same.

The object of my invention is to produce liquid dyes for silk or woolen cloth, not affected by changes in the temperature, in a cheap and portable form, which may thus be kept and used in families as an article of domestic economy.

My invention consists in the production of liquid dyes, in all colors, from vegetable or mineral coloring-matters, so mixed and prepared with the proper proportion or quantity of highly-concentrated mordant that the same will endure both heat and cold and may be kept for any period without undergoing change, and will produce a complete and effectual dye upon either silk or woolen cloth or fabric at one application.

I employ both coloring-matters and mordants which have long been known and used. They may be either vegetable or mineral, or both; and my invention does not consist in the particular articles or ingredients used, but in the product or result obtained, and the mode and process by which the same is prepared and produced.

Different coloring-matters and mordants are used, according to the shade or color to be obtained, as is well understood by dyers and those acquainted with mixing and applying colors; but my invention does not depend upon the mixture of any specific ingredients, either coloring-matters or mordants, but is applicable to all mixtures of vegetable or mineral coloring-matters (or both) and mordants which will produce a required shade or color upon woolen and silk fabrics of a fixed, permanent, and effectual character at one application.

It is well known to chemists and to those accustomed to prepare and use dyes that certain coloring-matters and certain mordants have an affinity for woolen fabrics, and others for silk fabrics, so that many substances which alone or in mixture will produce an effectual and practical dye upon the one will not do so upon the other. It is also well known that certain substances in dyeing will neutralize and counteract the effect of others.

As one part of my invention is the production of dyes in all colors which will dye both wool and silk equally well, it is important whenever, in the preparation of the dyes, substances (either coloring-matters or mordants) are used which have an affinity for one but a repugnance for the other fabric, also to use in connection with them other substances which have an affinity for the other fabric, but which will not act to neutralize the other substances, taking care at all times to use such coloring-matters and mordants as will best add to the effect and permanency of the color desired.

The coloring-matters and mordants which have an affinity for either silk or wool are well known to dyers and others, and it is needless to mention the mixtures and combinations which are or may be made of them, as they are various and change with every color or shade of color, it being essential only that such substances and ingredients be used that one of them has an affinity for wool and one for silk, and neither neutralizes the other.

To enable others to make use of my invention, I now proceed to describe it.

I put into a vat or kettle a quantity of water proportioned to the dye to be made. Into this are poured or turned the coloring-matters and mordants in quantities each suited to the quantity of the other and varying with the dye, the strength of the color, and shade desired. The coloring-matters are in bulk in a crude state as they come from the dealers. They may first be pulverized, but there is no advantage in it, and it is not my practice to do so. They are usually put into the vat in lumps and blocks, except when they come from the dealers in powder, in which case the contents of the packages are emptied into the vat. The mordants employed are in the form either of liquids or crystals. These substances are then thoroughly boiled together, with frequent stirring, until they are completely dissolved. The boiling is then continued until the mass becomes as highly concentrated as is possible—that is, until the liquid has absorbed so much of the coloring-matter and mordant that it is not possible for it to take up more, or, in other words, until the liquid has absorbed all of the coloring-matter and mordant which it is capable of holding in solution.

No length of time can be specified for the boiling, as this varies with different substances and quantities; but it is essential to the process that the boiling should continue until the result already specified is attained—that is, until the liquid has become so highly concentrated that no more of the coloring-matter or mordant can be absorbed in it.

The preparation is now ready to be put in vials for sale, and may be kept for any length of time in any temperature and without injury from heat or cold, and may be used with equal effect upon either woolen or silk goods. It may be used according to the following directions, (but I claim no novelty or invention in the same,) viz: All goods to be dyed must be thoroughly cleansed in strong soap-suds, so as to remove all stains, grease-spots, and streaks, and rinsed in clean hot water. To use black, browns, drabs, fawn or tan, light leather, medium leather, slates, stones, and wines, have in a clean kettle hot water enough to cover the goods to be dyed; shake the vial until the contents are thoroughly mixed, and pour into the water; boil and put in the goods loosely while wet; then boil, for silks, fifteen to twenty minutes, according to shade desired. Woolens require longer than silk. Black on woolens must be boiled from half an hour to an hour. Lift and stir the goods constantly with a stick, to allow the dye to penetrate every part of the fabric alike. When the goods are the right shade take them out, and if the shade be black, slate, or stone, wash them in weak soap-suds and rinse in clean cold water. For other colors use clear water only. Hang them out in the air a few minutes, and iron while damp.

It is well to put into the liquor a small piece of cloth to take out and test the shade, and thereby determine when the color is deep enough. If it is too light, keep the goods in longer.

For yellow, corn, lemon, light blue, dark blue, and greens proceed as for colors above, except that the water must not boil, but be kept quite hot.

In dyeing goods any color will take a darker shade. If the goods are not white, it is better to discharge all the color possible by boiling in strong soap-suds and rinsing, repeating the boiling as long as any color comes out into the water. Many colors can in this way be prepared so as to take other medium or dark colors. Every color will dye black.

Always test the color by dyeing a small piece of white silk or flannel. Use only soft water, and be sure to have enough to cover the goods. A vial containing about two ounces will dye, on an average, about ten yards of silk or six or eight yards of woolen goods.

In dyeing with these colors do not use iron kettles, but use earthenware, porcelain, copper, or tin which is not worn.

Any other method of mixing, commingling, and distributing the component parts of the dye in liquid, so that the same shall reach the degree of mixture and concentration necessary, such as the use of a vacuum, steam, &c., may be employed instead of the boiling above described. I prefer to use the boiling as heretofore described, as the most convenient. Mordants may also be introduced into the vat in other forms besides liquids and crystals. I employ these forms, as the most convenient.

Having described my invention, I claim as follows:

1. As a new manufacture or composition of matter, and as a new article of commerce, liquid dyes produced from vegetable or mineral coloring-matters, so mixed and prepared with the proper proportion or quantity of highly-concentrated mordant that the same will endure both heat and cold, and may be kept for any period without undergoing change, and will produce a complete and effectual dye upon either silk or woolen cloth or fabric at one application.

2. The process of making liquid dyes in all colors by the mixture and preparation of coloring-matters and highly-concentrated mordants, either of vegetable or mineral origin, or both, in such manner that the dyes will endure both heat and cold, and may be kept for any period without undergoing change, and will produce a complete and effectual dye upon either silk or woolen cloth or fabric at one application, in the manner substantially as above set forth.

GEO. H. REED.

Witnesses:
ROBERT LEVI,
WILLARD C. VAN DERLIP.